Sept. 25, 1956

L. DEBUIT 2,764,036

ANTI-SHOCK DEVICE FOR CIRCUIT
BREAKERS, SWITCHES, OR
THE LIKE APPARATUS

Filed Nov. 13, 1952

INVENTOR
LOUIS DEBUIT.

BY
ATTORNEYS

INVENTOR
LOUIS DEBUIT.

Sept. 25, 1956     L. DEBUIT     2,764,036
ANTI-SHOCK DEVICE FOR CIRCUIT
BREAKERS, SWITCHES, OR
THE LIKE APPARATUS Filed Nov. 13, 1952     3 Sheets-Sheet 3

INVENTOR
LOUIS DEBUIT.
BY
ATTORNEYS

Patented Sept. 25, 1956

2,764,036

ANTI-SHOCK DEVICE FOR CIRCUIT BREAKERS, SWITCHES, OR THE LIKE APPARATUS

Louis Debuit, Grenoble, France, assignor to Etablissements Merlin & Gerin, Grenoble, France Application November 13, 1952, Serial No. 320,214
Claims priority, application France November 21, 1951

25 Claims. (Cl. 74—527)

The invention relates to an anti-shock device for preventing the rotation of a turnable mass and particularly for preventing any accidental, unintended or untimely movement of a circuit breaker, switch, or other contact apparatus under the effect of a shock or of strong vibrations, so that the circuit breaker, when in its closed position, might accidentally and unintentionally be opened, or, when in its open position, might be accidentally closed.

The object of the invention thus is a device which blocks the movement of the movable equipment as soon as a shock acts upon the contact apparatus. With this object in view, the device comprises, on the one hand, a rotatable piece, in the following specification and in the claims termed "wheel" which is rotatable in a plane parallel to the plane in which the movable equipment of the circuit breaker is moved or turned. On the other hand, the device includes pieces hereinafter called "fly pieces" which, under the influence of a shock or of strong vibrations freely move and by their displacement block the wheel and through the intermediary thereof the movable equipment.

As long as the circuit breaker is not subjected to any strong vibrations or to a shock, these fly pieces are in a position which allows the wheel to turn freely and thus allows the movable equipment to execute its regular closing or opening movement.

When the circuit breaker is in its open or in its closed position, the wheel of the anti-shock device is in such a position with regard to a first set of fly pieces that under the action of a shock, the fly pieces, while being displaced parallel to the plane of the wheel, may engage lateral projections, hereinafter termed "tenons" secured to, or of one piece with, the wheel and may block the wheel and the movable equipment against rotational displacement.

More particularly, the device comprises at least two fly pieces which are radially displaceable in the same direction but in opposite senses.

The invention is further concerned with a device which may act upon the movable equipment in a sense opposite to that in which those forces are effective which accidentally and unintentionally tend to move this equipment. In this way a delay in the setting up of this unintended movement is obtained, a delay sufficient to give the fly pieces the necessary time for moving between the projections of the wheel and thus to block the movable equipment before it could start any untimely motion.

With this object in view, the device of the invention provides for the wheel an axis of rotation eccentric to the axis of the movable equipment, the movements of both shafts being made concurrent by a lever mechanism. This mechanism includes two levers, preferably articulated at a point close to the dead-center of their motion and preferably of one piece with or secured to a rotatable member whose center of gravity is outside of its axis of rotation.

Another object of the invention is a device which not only blocks the movable equipment against the forces of a shock effective in a plane parallel to the plane of the wheel or to the plane of the opening or the closing movement of the circuit breaker, but blocks it also against the effect of transversal forces effective in a plane perpendicular to the first named plane. With this object in view, the device comprises a set of fly pieces which under the action of a shock are displaced in a plane perpendicular to the wheel and thereby block the wheel.

Another object of the invention is a device which by its form may serve directly as a bearing of the shaft or bar which carries the movable equipment of the circuit breaker or the like. Thus, no additional space is required when the device is to be mounted on existing circuit breakers with the considerable advantage with relation to space requirement that nothing need be changed at these circuit breakers. It will suffice simply to replace one of their bearings by another one which includes the anti-shock device of the invention.

Another object of the invention is a development of the fly pieces by means of which their sensitivity is considerably enhanced.

In order to describe and illustrate more specifically the invention, reference will now be had to the accompanying drawings in which embodiments of the invention will be illustrated by way of example. It will be readily understood however that these embodiments are intended to be illustrative of the invention but not limitative of its scope.

Figure 1:
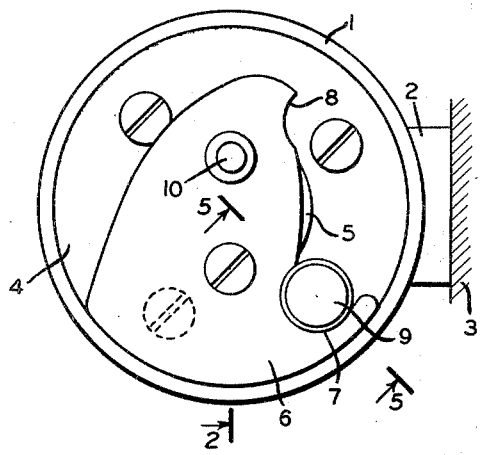
Fig. 1 is a front view of a device of the invention.
Figure 2:
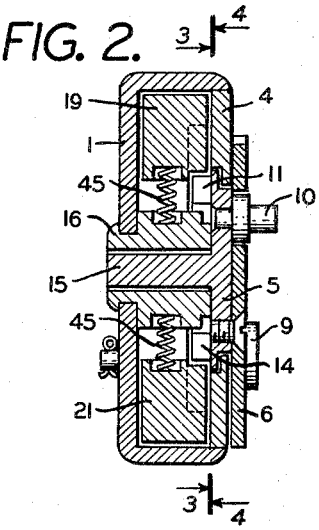
Fig. 2 is a section along line 2—2 of Fig. 1.
Figure 3:
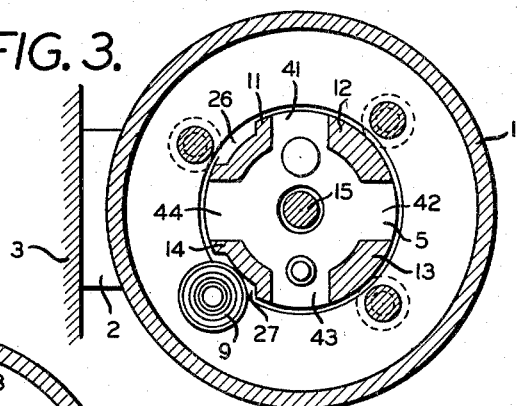
Figure 4:
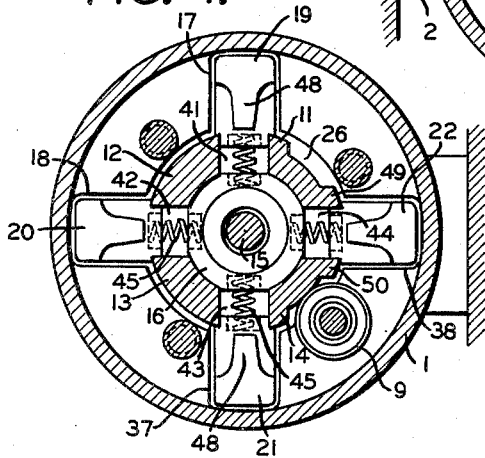
Figure 5:
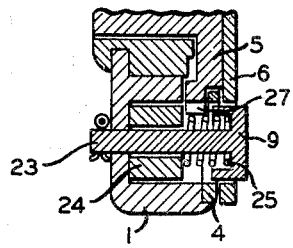
Figure 6:
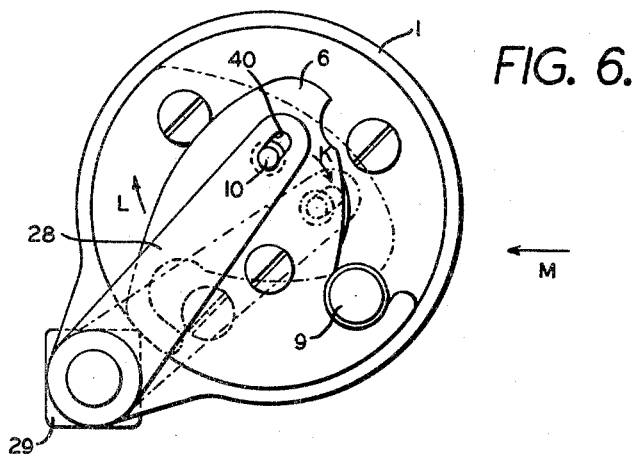
Figure 7:
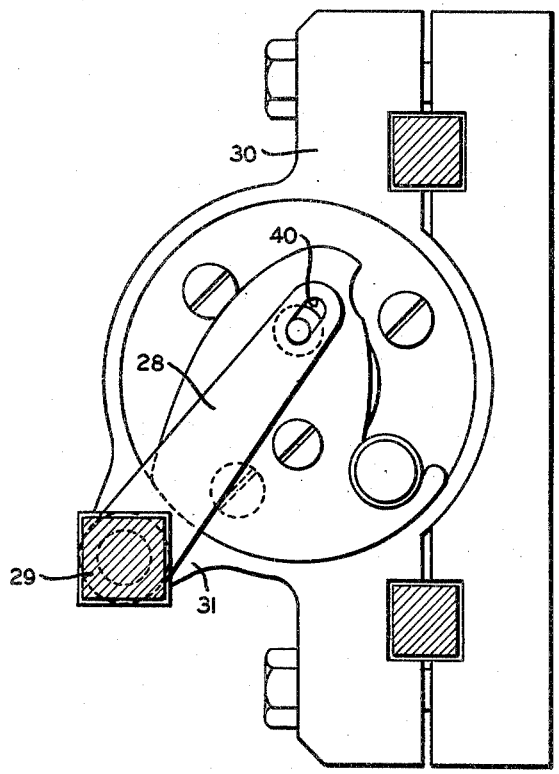
Figure 8:
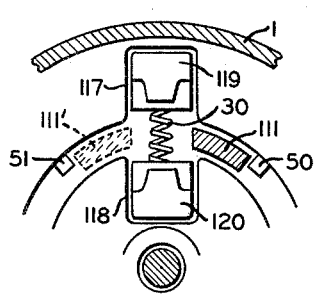
Figure 9:
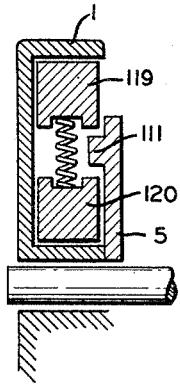
Figure 10:
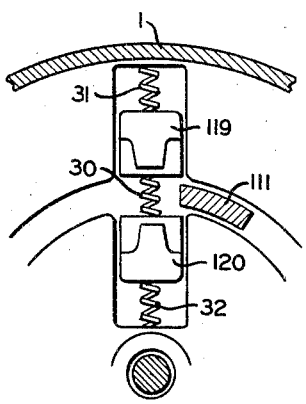
Figure 11:
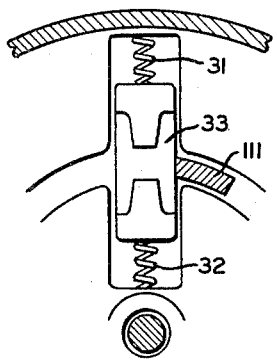
Figure 12:
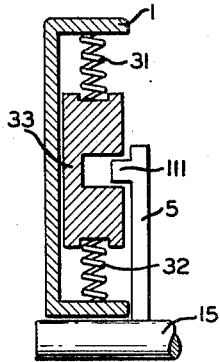
Figure 13:
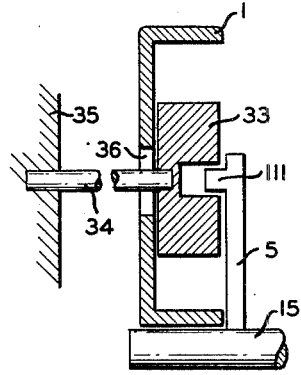

Figs. 3 and 4 are sections along the section line shown in Fig. 2, respectively seen in the directions 3—3 and 4—4;

Fig. 5 is a section along line 5—5 of Fig. 1;

Fig. 6 is a front view of the anti-shock device of the invention joined to a lever secured to the bar or shaft which carries the movable equipment; the positions of the device corresponding to the two positions "go" and "stop" of the switch being indicated in full and broken lines, respectively;

Fig. 7 is a front view of an anti-shock device which forms part of a bearing of a switch apparatus;

Figs. 8 and 9 respectively are a diagrammatic, fragmentary front view and an axial section of a set of two fly pieces on the same side of the center axis;

Fig. 10 is a modification of such a set of fly pieces in front view;

Figs. 11 and 12 respectively are a diagrammatic, fragmentary front view and an axial section of a double-acting fly piece; and Fig. 13 is a diagrammatic axial section of another modification of a double acting fly piece.

In the drawings, the casing or base piece of the device, designated by 1, is secured by its foot 2 to the frame 3 of a circuit breaker of any type, not shown on the drawings.

The lid 4 is fitted into this casing. A circular disc or "wheel" 5 is rotatable in the lid and is carried by a shaft or axle 15 journaled in a bearing 16 secured to the stationary base piece 1. To the outer face of the wheel and rotatable therewith about the wheel axis, there is secured a disc, hereinafter called "fly disc" 6 with two indentations 7 and 8 at its rim. In the one prescribed position of the circuit breaker, e. g. in its open position, fly disc 6 bears with its indentation 7 against a stop 9, as shown in Fig. 1 and in full lines in Fig. 6. In the other prescribed position of the circuit breaker, e. g. in its closed position, fly disc 6 is turned to bear with its other indentation 8 against stop 9 as indicated in dotted lines in Fig. 6.

A rotation about 90° of the wheel 5 and of the rotatable fly disc 6 corresponds to the full deflection of the movable equipment from the open into the closed position and conversely. Wheel 5 further carries a pin 10 which traverses fly disc 6 and is engaged in a slot 40 of a lever 28 secured to the shaft 29 of the movable equipment. (Figs. 6 and 7).

Wheel 5 further carries four lateral projections or tenons 11, 12, 13, 14, as will best be seen in Figs. 3 and 4. Projections 11 and 14 and the fly wheel rim adjoining them are provided with indentations 26 and 27, the function of which will be described later on. Between the projections 11, 12, 13, 14, there are passages 41, 42, 43, 44, Fig. 3, whose widths are the same as those of the grooves 17, 18, 37, 38, Fig. 4, provided within the base piece 1. When lid 4 is closed upon the casing 1, the passages 41, 42, 43, 44, are in their rest position, exactly in alignment with the grooves 17, 18, 37, 38, respectively. As Fig. 4 illustrates, the grooves 17, 18 and the grooves 37, 38 are arranged in two directions perpendicular to each other. Loose pieces termed "fly pieces" 19, 20, 21, 22, slide in these grooves and are urged radially outwards by springs 45, bearing with their one ends against the fly pieces and with their other ends against the bearing 16.

Under the influence of a shock arriving perpendicularly or obliquely of the plane against which the circuit breaker is secured—for instance the surface of frame 3 against which the foot 2 is secured—one or more of the fly pieces will be displaced towards the center of the casing or base piece 1 and engaged between the projections of the wheel 5. That part of the fly pieces which enters between the projections of the wheel is in the shape of a conical nose 48 so that the fly pieces may be engaged between projections even if the wheel has been slightly displaced and the passages between the projections are slightly out of alignment with the grooves.

Fig. 5 illustrates an arrangement of the stop 9 against which the eccentric disc 6 may bear with either one of its indentations 7 or 8. This stop too may serve as a fly piece. To this purpose the stop is provided with a stem 23 slidably held in the casing 1 for instance by means of a split pin. Another fly piece 24 may freely slide on stem 23. A spring 25 bearing with its one end against the head of stop 9 urges fly piece 24 towards the casing 1 leaving, in the absence of shocks, between the pieces 9 and 24 a free passage for the protruding edges 49, 50 bordering the indentations 26, 27 of the tenons 11, 14, respectively, when wheel 5 turns. If, however, caused by a transversal shock, one of the fly pieces 9 or 24 is displaced, it will move, when the circuit breaker is in its open position, into indentation 27 of tenon 14 and of the adjacent wheel rim, or, when the circuit breaker is in its closed position, will move into the indentation 26 of the projection 11 and of the adjacent wheel rim. In both positions, the wheel and consequently the movable equipment of the circuit breaker are blocked when a transversal shock occurs.

Fig. 6 illustrates the positions of the wheel of the antishock device and of the lever 28 secured to, or of one piece with, the shaft or bar 29 which carries the movable equipment controlled by the anti-shock device. As described hereinabove, the position corresponding to the open position of the circuit breaker is shown in full lines, and the position corresponding to the closed position of the circuit breaker in broken lines. The anti-shock device thus is disposed in a plane perpendicular to the shaft or bar 29, that is in a plane parallel to the plane in which the movable contacts are moved.

The device operates as follows:

When the circuit breaker is in its open position, lever 28 is in its upper position as shown in full lines in Fig. 6. The fly disc 6 bears with its indentation 7 against stop 9. The fly pieces 19, 20, 21, 22 within the interior of the casing 1, Figs. 2 and 3, are pushed by their respective springs 45 towards the periphery of the casing and thus into rest position, and the wheel 5 may turn freely. If now the circuit breaker is closed, the shaft turns about 15 to 20° and the lever 28 on this shaft 29 reaches the position shown in broken lines in Fig. 6. In this movement, lever 28, by means of pin 10 and slot 40, takes along wheel 5. Wheel 5 rotates about 90° and the passages 41, 42, 43, 44 will now be brought into alignment with the grooves 38, 17, 18, 37, respectively, of the casing or base piece 1. Wheel 5 may freely execute this movement since the fly pieces 19, 20, 21, 22 are in their peripheral rest positions, thus outside of the area through which the projections 11, 12, 13, 14 of the wheel move.

Let now the circuit breaker be in the open position and a shock arrive which is perpendicular to the plane against which the switch apparatus is secured to the frame. If the shock is directed in the sense which tends to open the contact, nothing will happen since the movable equipment is prevented from moving farther in the opening sense by stop 9 against which disc 6 bears with its indentation 7. Contrariwise, should a shock arrive in the sense which would tend to close the contacts, the equipment would have the tendency to close the switch apparatus, that is to turn lever 28 in the sense of arrow K, Fig. 6, and to take along fly disc 6 in the sense of arrow L. Now, fly disc 6, through its inertia, exerts a moment in the sense opposite the arrow L, in other terms, tends to block lever 28 and consequently the movable equipment.

If the moments of inertia of the movable equipment and of the fly disc 6, relatively to their respective centers of rotation are properly chosen, the moment exerted by the disc will prevail over that of the movable equipment and this equipment will remain blocked for a certain length of time sufficient to allow the inner fly pieces to enter into action.

In the present instance, it will be fly piece 20 which under the influence of the shock will be displaced and will overcome the action of its spring 45 and will move to an active position with its nose 48, penetrated between the projections 12 and 13 of wheel 5 and block any movement of the wheel. From then on, the movable equipment is securely blocked in its open position. Fly disc 6 thus has accomplished its task, that is to prevent any movement of the movable equipment before the inner fly pieces enter into action. In fact, should such a movement of the movable equipment take place to too large an extent, before the inner fly pieces could start their movement, the wheel would rotate to such an extent that the tenons would pass the fly pieces and the fly pieces could no longer enter into the passages between the projections and thus could no longer block the wheel.

In the foregoing, the function of the device has been described for a shock perpendicular to the plane of the base against which the circuit breaker or other switch apparatus is secured and which arrives from the rear. If the shock is not perpendicular to this plane but has any direction perpendicular to the axis of rotation of the wheel, the wheel will be blocked no longer by a single one but by at least two of the fly pieces. In such a case it may be possible that the fly pieces do not act simultaneously. The result, however, will always be the same, the wheel and the movable equipment will be blocked.

It has already been pointed out that each fly piece is shaped with a tapered nose at its end where it enters into the passage between adjacent projections or tenons. The fly pieces may thus slide between the tenons even if the passages are slightly displaced out of alignment with the grooves. Obviously, if the fly pieces were of equal width over their whole length, already the slightest displacement of the tenons, of a few tenths of a millimeter, over the grooves would suffice to bar the fly pieces from entering the passages.

In case a shock arrives in a plane parallel to the plane of the base against which the circuit breaker is secured, the two fly pieces 9 and 24 become operative and block the movement of the wheel.

If, for instance, the shock arrives from the left hand side of the contact apparatus, as seen in Fig. 5, the fly piece 9 through its inertia will be displaced within the device towards the left and, when the contact apparatus is in its open position, will enter into the indentation 27 of wheel 5 and of tenon 14 or, should the contact apparatus be closed, into the indentation 26 of the wheel and of tenon 11.

In both cases the wheel will be blocked so that any accidental, unintentional movement of the movable equipment is excluded. For a shock which arrives from the right hand side, fly piece 24 will enter into action and will function in the same way as described with regard to fly piece 9. For shocks intermediate of both or in a plane intermediate of the aforementioned planes, fly disc 6 and fly piece 9 will become effective simultaneously, together with, or without any movement of the inner fly pieces.

The anti-shock device of the invention may be adapted to any existing circuit breaker, switch, or the like, without essential change of the required space, provided, sufficient space is available between one of the bearings and the neighboring pole for mounting the lever upon the shaft or bar of the movable equipment and for placing the device on the chassis or frame of the circuit breaker. Should such a solution not be possible, one of the bearings of the shaft, in accordance with a further development of the invention, might be replaced by the anti-shock device itself, an arrangement wherein the casing of the anti-shock device serves simultaneously as a bearing.

Fig. 7 illustrates, by way of example, such a solution in a section through the framework and the shaft or bar of a circuit breaker between the anti-shock device and the neighboring pole showing the anti-shock device in elevation. 30 is a plate which encloses or surrounds and supports the anti-shock device. The casing is shaped with an ear 31 which forms the bearing in which may turn the shaft or bar 29 of the movable equipment. Lever 28 which is under control of wheel 5, is mounted on this shaft. It is obvious that this device may be applied subsequently to any circuit breaker already installed or in stock without any change of its dimensions, simply by replacing one of the bearings.

Figs. 8 and 9 show an embodiment of a pair of conjugate fly pieces 119, 120, slidable in grooves 117, 118, which serve as guides within a casing 1 joined to or forming part of the frame or chassis of the circuit breaker. The two fly pieces are held in their rest positions by means of spring 30.

A projection or tenon 111 is secured to or is of one piece with the wheel 5, the movement of which is described hereinabove is positively coupled with that of the movable equipment. This tenon may enter the space between the two fly pieces 119, 120, as long as they are in their rest positions.

Tenon 111 may occupy two positions 111 and 111' symmetrically of the axis of movement of the two fly pieces, these positions being defined or the movement of the wheel limited by two abutments such as schematically indicated at 50, 51. The width of the tenon 111 and of the fly pieces 119, 120, are so chosen that the two positions 111 and 111' respectively correspond to the "open" and "closed" positions of the movable equipment.

Under the influence of a shock or of a shock component, and according to the direction of the shock relatively to the axes of the fly pieces, the one or the other fly piece, or both alternatingly will enter into the path of the tenon 111 and thus immobilize it in one of the positions 111 or 111'.

In accordance with a further development of this feature of the invention each of the fly pieces may be subjected to the action of two springs acting in opposite senses, such as by the arrangement of a median spring 30 and two outer springs 31, 32, Fig. 10.

In this arrangement the fly pieces may execute oscillatory motions, and the characteristics of the springs with relation to the masses of the fly pieces may be chosen or regulated so that differing periodic or aperiodic movements of the two fly pieces result.

A variant is illustrated in Figs. 11 and 12 in which the two fly pieces of Fig. 10 are united into a unique piece 33, the spring 30 of Fig. 10 thus being replaced by a rigid connection. The solution of two independent fly pieces however is preferable.

The fly pieces may also be supported by springs arranged transversely of the direction of their displacement, combined or not with the axial springs of the preceding examples. In Fig. 13 the fly piece unit is supported by an elastically flexible rod 34 passed through a slot 36 and fixed within a stationary part 35 of the frame of the circuit breaker.

It is also possible to support the fly pieces of a conjugate pair, such as 119, 120, individually by an independent rod, both rods forming an angle, for example of 90° and being secured at two different points of the circuit breaker.

It will be readily understood that instead of the guide groove any other equivalent guiding means may be employed, for example a rod on which the fly piece or the fly pieces may slide and about which the spiral springs may be wound.

I claim.

1. Anti-shock device incorporating movable inert mass means and blocking means for preventing accidental, unintended movements of a turnable mass about its turning axis out of its prescribed position, particularly unintended movement of the movable components of circuit breakers, switches, and the like apparatus, said anti-shock device including a stationary base means, a wheel member journaled on said base means and positively coupled with said turnable mass and disposed with its axis of rotation parallel to the turning axis of said turnable mass means comprising at least two fly pieces mounted for movement between said base means and said wheel means under the impulse of a shock between a rest position and an active position, stationary guiding means on said base means for guiding the movement of the fly pieces in a path crossing that of the wheel means, means for returning said fly pieces into a rest position, said blocking means being disposed at said wheel and adapted to partake of any movements of said wheel means and to be engaged by a fly piece when at least one of said fly pieces moves out of its rest position into its active position thereby to hold by means of at least one fly piece said wheel means blocked at said base piece and prevent any accidental unintended turning movement of said turnable mass.

2. Anti-shock devce including blocking means for preventing accidental, unintended movements of a turnable mass about its axis out of a prescribed position, particularly unintended movements of the movable components of circuit breakers, switches, and like apparatus, said anti-shock device including a stationary base member, wheel means journaled on said base member, means positively coupling the wheel means with the turnable mass for movement therewith, said wheel means having its axis of rotation parallel to the turning axis of said turnable mass, inert mass means comprising at least two fly pieces mounted for movement between said base member and said wheel means between rest and active positions, stationary guide means on said base member for guiding the movement of said fly pieces in a path crossing the path of movement of said wheel means, said fly pieces moving in response to shock impulses, means for returning said fly pieces into the rest position, said blocking means being operably associated with said wheel means, partaking of the movement thereof and adapted for engagement by said fly pieces, the said fly pieces, their associated guiding means and the blocking means cooperable therewith being disposed in directions crossing each other so that under shock impulse at least one of said fly pieces moves out of rest position to active position to engage said blocking means and thus hold said wheel blocked on said base member whereby accidental, unintended turning movement of the turnable mass is prevented.

3. Device as set forth in claim 1 wherein said at least two displaceable fly pieces are disposed substantially across each other at right angles.

4. Device as set forth in claim 1 wherein said fly pieces comprising at least a pair of opposite fly pieces disposed diametrically of each other and of said wheel.

5. Anti-shock device incorporating blocking means for preventing accidental, unintended movements of a turnable mass about its axis out of its prescribed position, particularly unintended movement of the movable components of circuit breakers, switches, and like apparatus, said anti-shock device including a base member, a wheel on said base member, means coupling the wheel with said turnable mass, said wheel being disposed with its axis of rotation parallel to the turning axis of said turnable mass, said anti-shock device further including an inert mass means comprising at least two fly pieces mounted for movement responsive to shock impulses between said base member and said wheel from a rest position to an active position, stationary guide means on said base member for guiding the movement of the fly pieces in a path crossing the path of the wheel, a spring between each fly piece and the base member for returning the fly piece into its rest position, said blocking means being disposed on said wheel to partake of any movements thereof and adapted for engagement by said fly pieces so that when responsive to shock impulses at least one of said fly pieces moves out of its rest position and engages said blocking means holding said wheel block on said base member thereby preventing accidental, unintended movement of said turnable mass.

6. Device as set forth in claim 1 wherein said at least two fly pieces include a pair of fly pieces adapted for movement in opposite directions and disposed radially at the same side of the wheel axis.

7. Device as set forth in claim 6 wherein a spring is disposed as a returning means between the fly pieces of said pair tending to urge them apart from each other.

8. Device as set forth in claim 7 wherein additional outer springs are disposed at said fly pieces, said springs bearing against said base piece so as to urge the fly pieces towards each other against the action of the first named spring.

9. Anti-shock device including blocking means for preventing accidental, unintended movements of a turnable mass about its axis out of its prescribed position, particularly unintended movements of the movable components of circuit breakers, switches, and like apparatus, said anti-shock device including a stationary base member, a wheel means journaled on said base member and positively coupled with said mass and disposed with its axis of rotation parallel to the turning axis of said turnable mass, said device further including an inertia responsive mass means comprising at least one fly piece disposed between said base member and said wheel means for movement between a rest position and an active position, stationary guide means on said base member guiding the movement of said fly piece in a path crossing that of the wheel means, means for returning said fly piece into rest position, said blocking means comprising tenon means on said wheel disposed and adapted, on controlled, intended movement of the wheel with the mass, to pass without interference by said fly piece when they are in rest position, whereas, on a shock and on movement of the fly piece caused thereby, said fly piece is moved into the path of said tenon means thereby blocking the movement of said tenon means and said wheel.

10. Device as set forth in claim 9 wherein said tenon means is a lateral projection of said wheel and said fly piece having a throat at its median portion thereby to allow passage of said tenon means through said throat when the fly piece is in its rest position, and wherein said fly piece is further disposed so as to move out of a median rest position in opposite directions under shocks in opposite senses thereby to move into the path of said tenon means and block movement thereof and of said wheel.

11. Device as set forth in claim 10 wherein an elastically flexible rod is secured to said base piece and said fly piece thereby to hold elastically the fly piece in said median position.

12. Anti-shock device including blocking means for preventing accidental, unintended movements of a turnable mass about its turning axis out of its prescribed position, particularly unintended movements of the movable components of circuit breakers, switches, and like apparatus, said device including a stationary base piece and a wheel means, a shaft supporting each of said wheel means and said turnable mass, the shaft supporting said wheel means being journaled on said base piece, link mechanism coupling said wheel means and said turnable mass together and operative to move said turnable mass and said wheel means between two prescribed rest positions, said link mechanism having at least one dead-center position, at least one of the prescribed rest positions of said wheel means corresponding to a position at least closely adjacent said dead-center position, said device further including an inert mass means comprising at least two fly pieces disposed for movement between said base piece and said wheel means between rest and active positions, stationary guide means on said base piece for guiding the movements of said fly pieces in a path crossing that of said wheel means, said blocking means being operatively associated with said wheel means to partake of the movements thereof and adapted for engagement by at least one of said fly pieces in its active position so that when, due to shock, a fly piece moves from rest to active position it engages the blocking means and thus holds the wheel means blocked on said base piece and prevents accidental, unintended movement of said turnable mass.

13. Device as set forth in claim 12, including bearings for said turnable mass and said link mechanism being mounted at one of the bearings of said turnable mass.

14. Anti-shock device incorporating movable inert mass means and blocking means for preventing accidental, unintended movements of a turnable mass about its turning axis out of its prescribed position, particularly unintended movement of the movable components of circuit breakers, switches, and the like apparatus, said anti-shock device including a stationary base means, a wheel member journaled on said base means and positively coupled with said turnable mass and disposed with its axis of rotation parallel to the turning axis of said turnable mass, means comprising at least two fly pieces mounted for movement between said base means and said wheel means under the impulse of a shock between a rest position and an active position, stationary guiding means on said base means for guiding the movement of the fly pieces in a path crossing that of the wheel means, means for returning said fly pieces into a rest position, said blocking means being disposed at said wheel and adapted to partake of any movements of said wheel means and to be engaged by a fly piece when at least one of said fly pieces moves out of its rest position into its active position thereby to hold by means of at least one fly piece said wheel means blocked at said base piece and prevent any accidental, unintended turning movement of said turnable mass, and further including a turnable fly disc with its turning center of gravity eccentric to its axis said fly disc being disposed on said wheel coaxially and rotatable therewith, said fly disc being so disposed at the wheel that its moment of gravity acts in a sense opposite to the sense of any moment which might accidentally and unintentionally bring said mass out of its prescribed position, thereby to retard the setting in of any accidental, unintended movement of said turnable mass.

15. Device as set forth in claim 2 wherein said two fly pieces, their associated guiding means and said blocking means are disposed substantially in a common plane and wherein said device includes at least a third fly piece cooperable guiding means and additional blocking means embodied with the wheel means and engaged by said third fly piece moving in a direction crossing said common plane.

16. Device as set forth in claim 15 wherein said two fly pieces and said third fly piece are provided, disposed and movable in three directions perpendicular to one another.

17. Device as set forth in claim 1 and in which said at least two fly pieces include at least two fly pieces disposed perpendicularly of each other and of the axis of rotation of said wheel.

18. Device as set forth in claim 1 wherein several fly pieces are provided, disposed and movable in three directions perpendicular to one another, at least two thereof perpendicular to each other and to the axis of rotation of said wheel and wherein in the third of these directions a set of two fly pieces is provided, adapted and disposed for moving in two opposite senses of displacement.

19. Device as set forth in claim 9 wherein said tenon means projects from said wheel, a stop member provided on said base piece, two abutments on said wheel for cooperation with said stop member, said abutments being disposed relatively to said stop member so as to determine two stop positions of said wheel limiting the deflection thereof in both directions symmetrically of the path of displacement of one of said fly pieces, said tenon means being disposed on said wheel to allow free displacement of the fly piece when the wheel occupies either one of the stop positions, but preventing the fly piece from displacement in any other position of the wheel.

20. Device as set forth in claim 19 wherein said fly piece is of a tapered shape so as to make possible its translatorial motion and passing at said tenon even at small deflections of said wheel and tenon from said stop positions.

21. Anti-shock device incorporating blocking means for preventing accidental, unintended movements of a turnable mass about its axis out of a prescribed position, particularly for preventing unintended movements of the movable components of circuit breakers, switches, and like apparatus, said device including a stationary base member, wheel means journaled on said base member, means coupling the wheel means with said turnable mass whereby movement of the latter moves the former, said wheel means having its axis of rotation parallel to the turning axis of said turnable mass, said anti-shock device further including inertia responsive means comprising at least one pair of displaceable fly pieces movable responsive to shock impulses between a rest position and an active position, said fly pieces of the pair being disposed opposite each other and mounted for movement between said base member and said wheel means in opposite directions, stationary guide means on said base member for guiding the movement of said fly pieces in paths crossing the path of said wheel means, means for returning said fly pieces into their rest positions, said blocking means being embodied with said wheel means and partaking of the movements thereof and further disposed for cooperative engagement by at least one of said fly pieces in the active position thereof so that under shock impulses at least one of said fly pieces moves out of rest position to active position to engage said blocking means to thereby hold said wheel means blocked on said base member so as to prevent accidental, unintended movement of said turnable mass.

22. Anti-shock device incorporating blocking means for preventing accidental, unintended movements of a turnable mass about its axis out of a prescribed position, particularly for preventing unintended movements of the movable components of circuit breakers, switches, and like apparatus, said device including a stationary base member, wheel means journaled on said base member, means coupling the wheel means with said turnable mass whereby movement of the latter moves the former, said wheel means having its axis of rotation parallel to the turning axis of said turnable mass, said anti-shock device further including inertia responsive means comprising at least one pair of displaceable fly pieces movable responsive to shock impulses between a rest position and an active position, said fly pieces of the pair being disposed opposite each other and mounted for movement between said base member and said wheel means in opposite directions, stationary guide means on said base member for guiding the movement of said fly pieces radially of said wheel means in paths crossing the path of said wheel means, means for returning said fly pieces into their rest positions, said blocking means being embodied with said wheel means and partaking of the movements thereof and further disposed for cooperative engagement by at least one of said fly pieces in the active position thereof so that under shock impulses at least one of said fly pieces moves out of rest position to active position to engage said blocking means to thereby hold said wheel means blocked on said base member so as to prevent accidental, unintended movement of said turnable mass.

23. Anti-shock mechanism for preventing unintended movements of a turnable mass about its axis in either direction responsive to shock impulses, comprising a stationary base, a turnable means mounted on said base for turning movements in opposite directions, about an axis parallel to the turning axis of said turnable mass, means coupling the turnable means to the turnable mass for turning movements therewith, blocking means embodied with said turnable means and partaking of the movements thereof, at least one inertia responsive member, means guiding said member for movement in a path crossing the path of said blocking means between a rest position clear of the path of movement of said blocking means and an active position intercepting said path, whereby responsive to shock impulse said member moves to active position to cross the path of said blocking means and prevent movement thereof and those of said turnable means and thereby said turnable mass, and means for returning said inertia responsive member to rest position to permit prescribed turning of said turnable mass in either direction.

24. Anti-shock device as claimed in claim 23, and further including at least two associated blocking means, inertia responsive members and guide means disposed at circumferentially spaced areas about the axis of said turnable means.

25. Anti-shock device as claimed in claim 23 in which said turnable means includes a shaft parallel to the turning axis of the turnable mass, means carried by said base member and journaling said shaft, and the means for returning said inertia responsive member to rest position comprising resilient means biased between said journaling means and the inertia responsive member.

References Cited in the file of this patent

UNITED STATES PATENTS

| | | |
|---|---|---|
| 1,622,159 | Linden et al. | Mar. 22, 1927 |
| 1,847,048 | Orr | Feb. 23, 1932 |
| 2,406,265 | Syrovy | Aug. 24, 1946 |
| 2,523,163 | Taylor | Sept. 19, 1950 |